United States Patent
Gates et al.

(10) Patent No.: US 6,880,524 B2
(45) Date of Patent: Apr. 19, 2005

(54) DIESEL EGR CONTROL

(75) Inventors: Freeman Carter Gates, Bloomfield, MI (US); Hossein Bina, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 4 days.

(21) Appl. No.: 10/063,350

(22) Filed: Apr. 15, 2002

(65) Prior Publication Data

US 2003/0192517 A1 Oct. 16, 2003

(51) Int. Cl.[7] .......................... F02D 11/10; F02D 41/04; F02M 25/07
(52) U.S. Cl. ................... 123/399; 123/478; 123/568.21
(58) Field of Search ........................ 123/568.11, 568.12, 123/568.18, 568.16, 568.21, 568.19, 361, 399, 478, 480; 701/108, 104, 105

(56) References Cited

U.S. PATENT DOCUMENTS

| | | | |
|---|---|---|---|
| 4,100,734 A | * 7/1978 | Ozaki et al. | 123/568.19 |
| 4,690,120 A | 9/1987 | Egle | |
| 5,746,190 A | * 5/1998 | Honda | 123/568.18 |
| 6,016,788 A | * 1/2000 | Kibe et al. | 123/399 |
| 6,039,025 A | * 3/2000 | Iwano et al. | 123/399 |
| 6,079,387 A | * 6/2000 | Mamiya et al. | 123/399 |
| 6,182,644 B1 | 2/2001 | Kotwicki et al. | |
| 6,199,537 B1 | * 3/2001 | Kowatari et al. | 123/399 |
| 6,367,462 B1 | * 4/2002 | McKay et al. | 123/568.21 |

* cited by examiner

Primary Examiner—Willis R. Wolfe, Jr.
(74) Attorney, Agent, or Firm—Allan J. Lippa; Allerman Hall McCoy Russell & Tuttle LLP

(57) ABSTRACT

A method for controlling a diesel engine exhaust gas recirculation system is described. In particular, a simplified diesel engine system is provided where presence of exhaust gas recirculation of flow is controlled via a two-position valve, while a quantity of exhaust gas recirculation is adjusted by varying the throttle valve. In this way, a reduced cost diesel exhaust gas recirculation system is achieved that provides the functionality of having variable amounts of exhaust gas recirculation.

18 Claims, 4 Drawing Sheets

DIESEL EGR CONTROL

BACKGROUND OF INVENTION

1. Field of the Invention

The field of the invention relates to control of diesel engines having exhaust gas recirculation.

2. Background Art

Diesel engines typically operate at substantially wide-open throttle conditions. This provides high fuel economy since pumping work is substantially eliminated. Since airflow is essentially unregulated, engine output is adjusted via a fuel injection amount. Since the diesel engine also operates almost exclusively in a lean air-fuel condition, changes in fuel injection amount predominantly control changes in engine output.

Some attempts have been made to introduce exhaust gas recirculation into diesel engines. Such recirculation lowers the formation of engine NOx emissions. However, to draw the recirculated exhaust gas flow into the manifold, engine throttling is used to create a pressure difference (i.e., either a vacuum or positive pressure). Thus, a throttle is used to create some vacuum or pressure, while position of an exhaust gas recirculation valve is adjusted to provide a desired recirculated exhaust gas flow.

The inventors herein have recognized a disadvantage with such a system. In particular, such systems are costly to implement since two active control valves are utilized, one for airflow and one for exhaust gas recirculation. Further, such systems may provide degraded estimates of EGR flow since they measure pressure across a valve having a variable orifice area. Since valve area may not be precisely known, such an approach may be inaccurate under some conditions.

SUMMARY OF INVENTION

The above disadvantages of prior approaches are overcome by a system for an internal combustion engine having a manifold with a first and second inlet, the system comprising:

a throttle coupled to the first inlet;

an exhaust gas recirculation unit coupled to the second inlet, where recirculated exhaust flow travels from an engine exhaust to the manifold, said unit comprising a restriction in said flow; and a controller for determining an actual exhaust gas recirculation amount based on a first pressure upstream of said restriction and a second pressure downstream of said restriction, adjusting said throttle based on a requested exhaust gas recirculation amount and said determined amount, and adjusting a diesel fuel injection amount in the engine based on an operating condition.

In one particular example, the restriction can be an on-off solenoid. In this way, a reduced cost system can be achieved. In particular, rather than using two control valves to perform a function, the present invention can operate with only a single adjustable valve. In other words, if a simple on-off solenoid is placed in the exhaust recirculation path, adjusting the throttle can vary the amount of recirculated exhaust flow and the absence or presence of flow can be controlled via the simple solenoid valve. As the throttle changes manifold pressure, recirculated exhaust gas flow will change. While this also adjusts the fresh airflow, since the engine is operating predominantly lean, engine output is mostly unaffected.

Thus, while it is possible to use a fully variable EGR control valve in the present invention, such a valve is not required.

In another aspect of the invention, disadvantages with prior approaches are overcome by:

a diesel engine having an intake manifold and an exhaust manifold; an electronically controlled throttle valve coupled to the intake manifold, wherein fresh airflow passes by said throttle valve;

an exhaust gas recirculation passage connecting said intake manifold and said exhaust manifold;

a two-position solenoid valve positioned in said exhaust gas recirculation passage.

BRIEF DESCRIPTION OF DRAWINGS

The advantages of the invention claimed herein will be more readily understood by reading an example of an embodiment in which the invention is used to advantage with reference to the following drawings wherein:

DETAILED DESCRIPTION

Figure 1A:
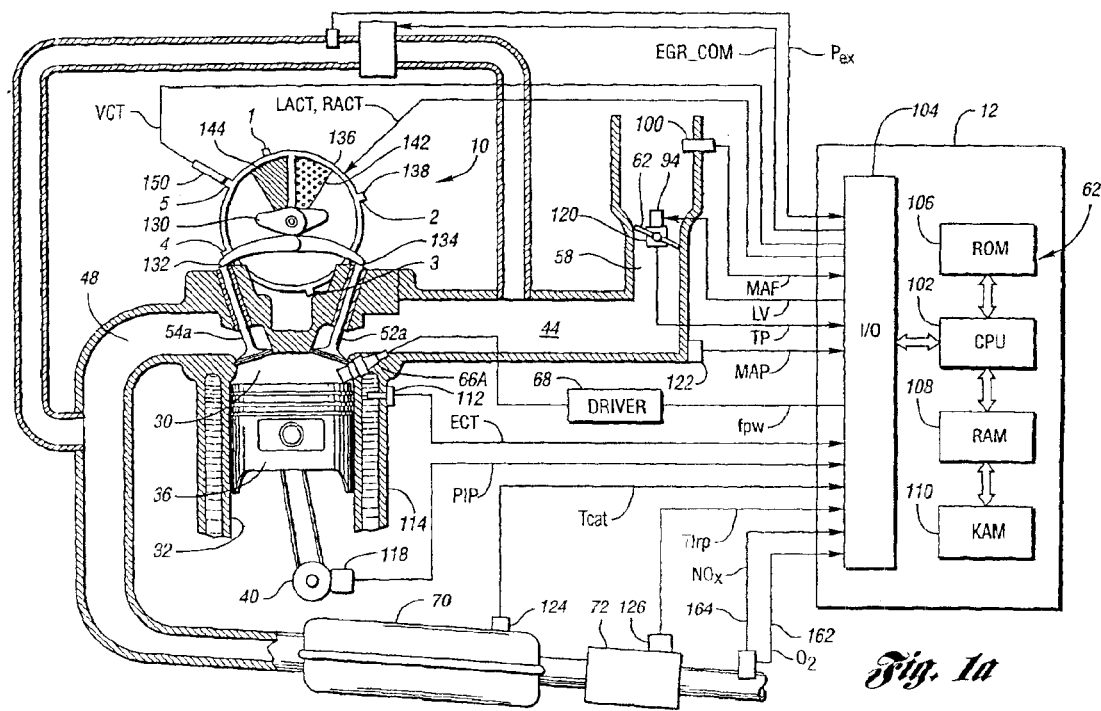
FIGS. 1*a* and 1*b* are a block diagrams of an embodiment in which the invention is used to advantage.

Direct injection compression ignited internal combustion engine 10, comprising a plurality of combustion chambers, is controlled by electronic engine controller 12. Combustion chamber 30 of engine 10 is shown in FIG. 1*a* including combustion chamber walls 32 with piston 36 positioned therein and connected to crankshaft 40. In this particular example, piston 36 includes a recess or bowl (not shown) to help in forming stratified charges of air and fuel. Combustion chamber or cylinder 30 is shown communicating with intake manifold 44 and exhaust manifold 48 via respective intake valves 52*a* and 52*b* (not shown), and exhaust valves 54*a* and 54*b* (not shown). Fuel injector 66A (in this example a diesel fuel injector) is shown directly coupled to combustion chamber 30 for delivering liquid fuel directly therein in proportion to the pulse width of signal fpw received from controller 12 via conventional electronic driver 68. Fuel is delivered to fuel injector 66A by a high-pressure fuel system (not shown) including a fuel tank, fuel pumps and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized to control fresh airflow and EGR flow as described later herein.

Nitrogen oxide (NOx) catalyst 70 is shown positioned upstream of particulate filter 72. NOx catalyst 70 reduces NOx when engine 10 is operating lean of stoichiometry.

Controller 12 is shown in FIG. 1*a* as a conventional microcomputer, including microprocessor unit 102, input/output ports 104, an electronic storage medium for executable programs and calibration values shown as read-only memory chip 106 in this particular example, random access memory 108, keep-alive memory 110, and a conventional data bus. Controller 12 is shown receiving various signals from sensors coupled to engine 10, in addition to those signals previously discussed, including measurement of inducted mass airflow (MAF) from mass airflow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. In a preferred aspect of the present invention, sensor 118, which is also used as an engine speed sensor, produces a predetermined number of equally spaced pulses every revolution of the crankshaft.

In the present invention, temperature Tcat is provided by temperature sensor 124 and temperature Ttrp is provided by temperature sensor 126.

Continuing with FIG. 1a, camshaft 130 of engine 10 is shown communicating with rocker arms 132 and 134 for actuating intake valves 52a, 52b and exhaust valve 54a,54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a,52b and exhaust valves 54a,54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a,52b, and exhaust valves 54a,54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3 and 4 are preferably used for measurement of cam timing and are equally spaced (for example, in a V-8 dual-bank engine, spaced 90 degrees apart from one another) while tooth 5 is preferably used for cylinder identification, as described later herein. In addition, controller 12 sends control signals (LACT,RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 provides an indication of both oxygen concentration in the exhaust gas as well as NOx concentration. Signal 162 provides controller a voltage indicative of the O2 concentration, while signal 164 provides a voltage indicative of NOx concentration.

Note that FIGS. 1a (and 1b) merely shows one cylinder of a multi-cylinder engine, and that each cylinder has its own set of intake/exhaust valves, fuel injectors, spark plugs, etc.

Figure 1B:
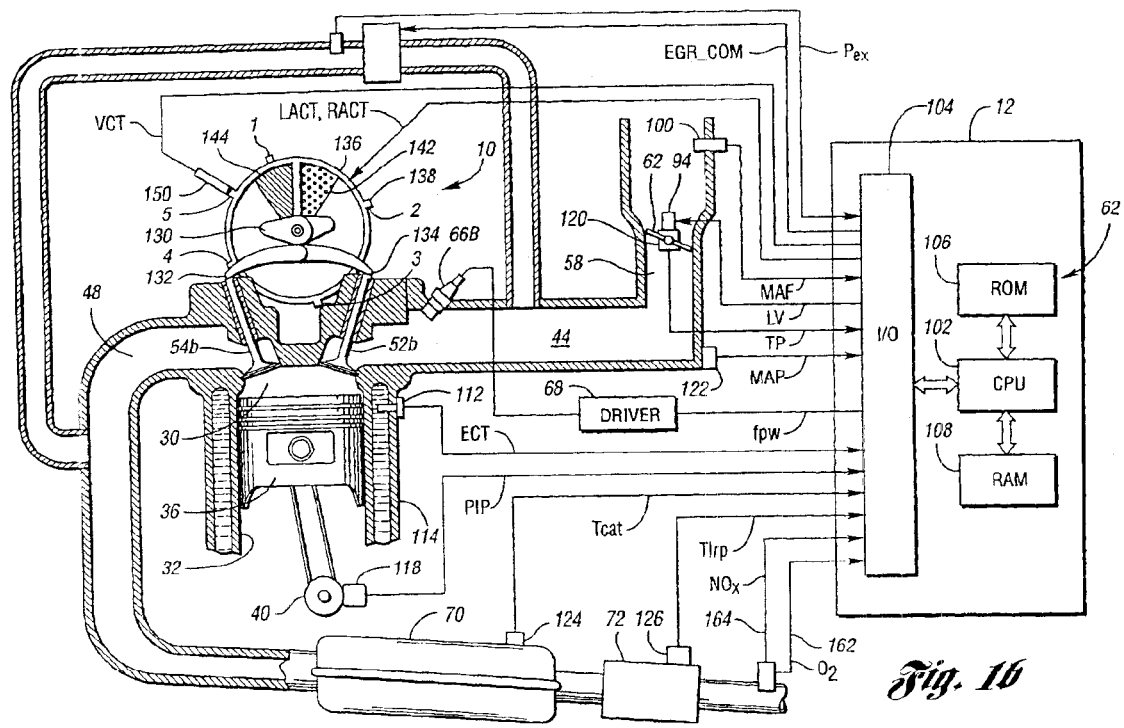

Referring now to FIG. 1b, a port fuel injection configuration is shown where fuel injector 66B is coupled to intake manifold 44, rather than directly cylinder 30.

Engine 10 is a diesel engine that combusts fuel via compression ignition. Thus, engine 10 operates at a predominantly lean air-fuel ratio. Further, engine output (torque) is controlled by adjusting a fuel injection amount and timing. Further, engine airflow is controlled via the electronic throttle to ensure that enough air is provided such that the combustion air-fuel ratio is sustained to be leaner than approximately 20:1.

Note that a turbo charger can be included in the present invention. The turbo charger can increase exhaust pressure to allow for increased EGR flow.

Also note that adjustments in the fresh airflow entering the engine has substantially no impact on engine output torque. This is because when the engine is operating lean, engine torque is limited by the amount of fuel provided for combustion, not the amount of air; i.e., lean operation by definition means "excess air". In this way, engine torque is varied by changing fuel injection, while engine torque is substantially unaffected by variations in excess air. However, there is a slight effect due to variations in engine pumping.

Also note that various methods can be used according to the present invention to maintain the desired torque such as, for example, adjusting fuel injection timing, fuel injection amount, variable cam timing position, and exhaust gas recirculation amount. Further, these variables can be individually adjusted for each cylinder to maintain cylinder balance among all the cylinder groups.

Exhaust passage 170 is shown allowing exhaust gas to flow from exhaust manifold 48 to intake manifold 44. A solenoid valve 172 is in position in exhaust passage 170. Solenoid valve 172 receives a signal (EGR_COM) from controller 12. Solenoid valve 172 is a two-position valve that comprises being either substantially open or substantially closed. Solenoid valve 172 can be of various types, such as, for example, an electromagnetic solenoid valve, a vacuum actuated solenoid valve, or a stepper motor actuated valve. Further, the valve opening can be of various types, such as, for example, a sharp edged orifice type, a rotary valve type, or various others. According to one embodiment of the present invention, the solenoid valve is electronically actuated and includes a sharp edged orifice type pinto-seat system. In this way, carbon deposits that may build up over the life of the engine can be cleaned by the repeated actuation of the valve. In an alternate embodiment, valve 172 can be a fully variable EGR control valve.

Exhaust pressure sensor 174 is shown upstream of valve 172. Sensor 174 provides an indication of exhaust pressure.

In general terms, the present invention controls EGR flow presence via actuation of solenoid valve 172. In other words, when EGR flow is desired, valve 172 is positioned in the open position. Alternatively, when no EGR flow is desired, valve 172 is positioned in the closed position. When EGR flow is present (valve 172 is open), the quantity of EGR flow is controlled by adjusting manifold pressure via the electronic throttle. An estimate of actual EGR flow is determined based on pressure upstream and downstream of the solenoid valve 172. In one example, EGR flow is determined by a function of the difference between exhaust pressure and intake manifold pressure as determined by sensors 174 and 122, respectively. In an alternate embodiment, EGR flow is estimated based on the product of the manifold pressure and the differential pressure across the solenoid valve. Further, estimates of either or both of manifold pressure and exhaust pressure can be determined based on engine operating conditions. For example, intake manifold pressure can be determined based on throttle position and engine speed. Alternatively, exhaust pressure can be determined as a function of engine airflow. Further, various other operating parameters can be included to improve the estimates of pressure, such as, for example, airflow temperature exhaust temperature, and various others. Also, as described later herein, a differential pressure sensor can be used to estimate flow through solenoid 172.

As a specific example, if it is desired to increase EGR flow, the electronic throttle valve is closed, thereby reducing manifold pressure. Similarly, if it is desired to decrease EGR flow, the electronic throttle valve is opened. In this way, it is possible to control EGR flow via the electronic throttle, and thereby provide a reduced cost system. In other words, rather than having an additional variable control valve for controlling EGR flow and airflow, a single variable control valve (the electronic throttle) is provided in combination with a simple two-position solenoid valve. These and other aspects of the present invention will be described more fully below.

Figure 2:
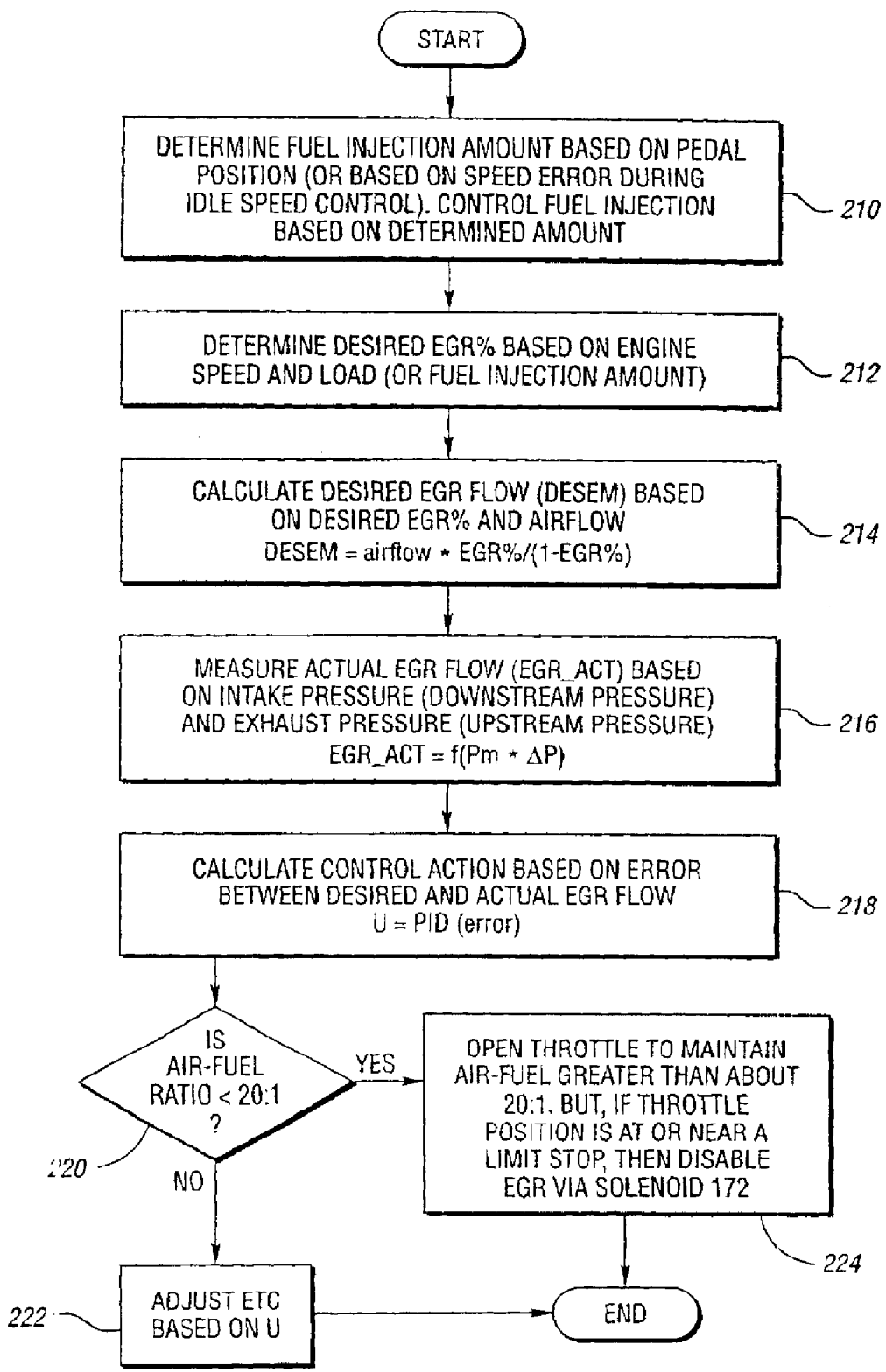
FIG. 2 is a high level flowchart which perform a portion of operation of the embodiment shown in FIGS. 1*a* and 1*b*.

Referring now to FIG. 2, a routine is described for controlling engine 10. First, in step 210, the routine determines a fuel injection amount based on pedal position. Alternatively, when operating in an idle speed mode, a fuel injection amount is determined based on an engine speed error. In this way, engine output is controlled based on either the driver request or an idle speed request. Further, the fuel injector is controlled based on the determined fuel injection amount. Next, in step 212, the routine determines a desired exhaust gas recirculation percentage (EGR %) based on engine speed and load. In an alternative embodiment, the desired EGR percentage can be determined based on engine speed and the fuel injection amount determined in step 210.

Next, in step 214, the routine calculates a desired EGR flow (DESEM) based on the desired EGR percentage and engine airflow according to the equation shown on the figure.

Next, in step 216, the routine measures, or estimates, the actual amount of EGR flow (EGR_ACT) based on intake manifold pressure (downstream pressure) and exhaust pressure (upstream pressure). In one example, actual EGR flows determined as a function of manifold pressure times differential pressure between the upstream and downstream pressure sensors. In other words, the differential pressure is determined as the differential pressure drop across valve 172. In an alternate embodiment, actual EGR flow can be estimated simply from differential pressure across solenoid valve 172. Also note that there are various methods for determining the pressures upstream and downstream of solenoid valve 172. For example, in the system according to FIGS. 1a and 1b, downstream pressure can be determined as manifold pressure, and upstream pressure can be determined as exhaust pressure. In particular, downstream pressure can be determined from a manifold pressure sensor, and upstream pressure can be determined from an exhaust pressure sensor. Alternatively, a single differential pressure sensor can provide the differential pressure across solenoid valve 172. Further, the upstream and downstream pressure can be estimated based on engine operating condition as described above herein.

Next, in step 218, the routine calculates a desired control action (U) based on error between desired and actual EGR flow. In one particular example, the present invention utilizes a proportional-integral-derivative (PID) controller based on the EGR flow error. Various other control architectures can be used, such as a proportional controller, or a proportional integral controller, or various other controllers including feedback and feed forward combined control action.

Next, in step 220, a determination is made as to whether the engine error-fuel ratio is less than a predetermined air-fuel ratio. In this example, the predetermined engine air-fuel ratio is said to be approximately 20:1, which represents an air-fuel ratio where engine smoking may begin. In other words, a determination is made as to whether controlling EGR flow by adjusting the electronic throttle valve is causing the excess quantity of air to be less than a prescribed amount correlating to a predetermined air-fuel ratio. For example, if actual flow is less than a desired flow (i.e., it is desired to close a throttle position to increase vacuum and thereby increase actual EGR airflow to approach the desired amount of EGR flow), then adjustment of the throttle valve toward the closed position may cause airflow to decrease, thereby causing the air-fuel ratio to become less than the prescribed amount. When the answer to step 220 is yes, the throttle valve is opened to obtain a minimum air-fuel ratio. However, if the throttle position is fully opened and the air-fuel ratio is smaller than a preselected value, EGR flow is disabled and solenoid valve 172 is set to the substantially closed position. Thus, according to the present invention, when EGR flow feedback control would cause engine air-fuel ratio to be richer than a preselected lean air-fuel ratio, EGR flow is first adjusted and then disabled to prevent the engine from operating beyond acceptable air-fuel ratio limits.

Alternatively, when the answer to step 220 is no, the electronic throttle control unit is adjusted based on the calculated control action U.

Note that the above embodiment is simply one example of operation according to the invention. The inventors herein have contemplated numerous modifications and alternate embodiments. For example, in step 210 of FIG. 2, an alternative approach would be to determine a desired fuel injection amount based on a desired engine output torque, where the desired output torque is based on one of a driver request, a cruise control request, or a traction control request.

Also, it may be desirable to diagnose degraded functionality of the solenoid valve. In one example, this could be accomplished by providing a diagnostic test where the throttle valve is kept fixed and the solenoid valve is cycled between opened and closed. During this test, manifold pressure can be monitored. If the change in manifold pressure is less than expected based on engine operating conditions, then a determination that the solenoid valve is degraded can be made.

Note that there are various other alternatives to practicing the present invention, including those described above. Accordingly, it is intended that the present invention be defined only according to the following claims.

Figure 3:
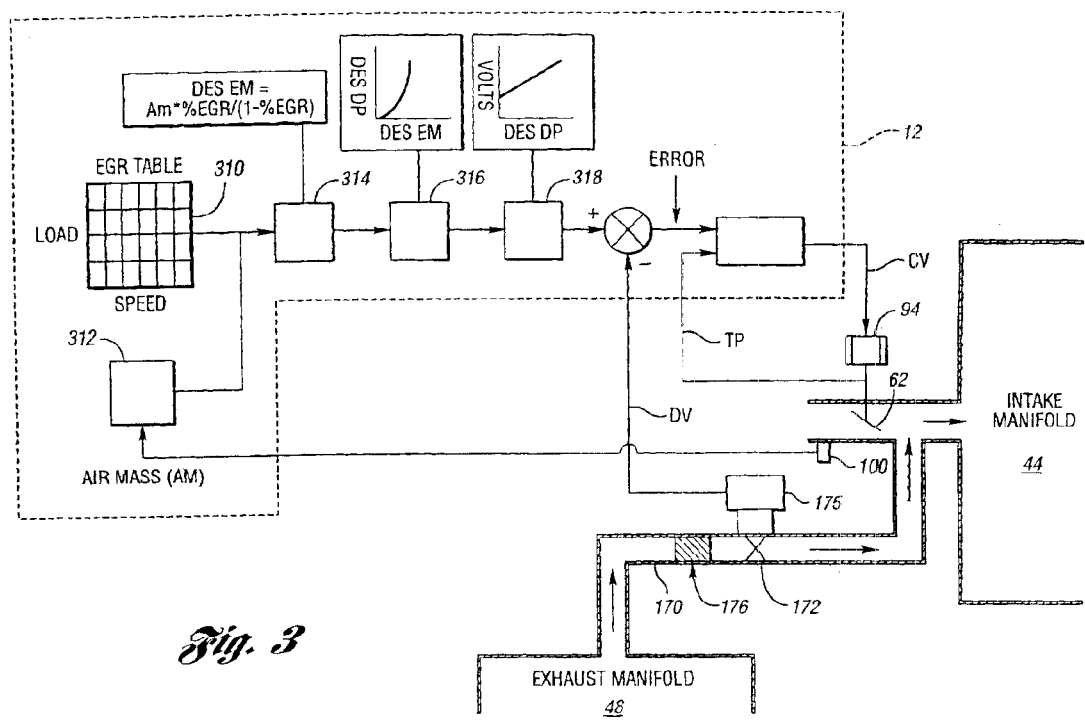
FIG. 3 is a control block diagram illustration of an embodiment of the present invention.

Referring now to FIG. 3, an alternate embodiment of the present invention is described. In particular, controller 12 is shown with a control method represented in block diagram form. Also, a differential pressure sensor 175 is shown for determining upstream and downstream pressure differential across the control valve 172. Also, arrows are shown indicating the direction of exhaust gas recirculation flow and airflow through throttle 62. Also, an EGR cooler 176 is shown in the exhaust passage upstream of valve 172. Note that an EGR cooler uses engine coolant to cool EGR gasses before they enter the intake manifold.

In this particular embodiment, a desired EGR mass (DESEM') is determined on engine speed and engine load and air mass (AM). In particular, a desired EGR percentage (EGR %) is determined based on engine speed and load and combined with air mass measured from the mass airflow sensor 100. From this, a desired differential pressure is obtained. In one particular example, the desired differential pressure (DESDP) is determined using a graphical representation as shown in FIG. 3. From the desired differential pressure, a desired sensor voltage is determined in block 318. Then, an error is found between the measured and actual differential pressure voltage (DV). Then, an error is found along with measured throttle position is fed to block 320, where the desired throttle position is adjusted based on the error signal and a control voltage is sent to actuator 94 to adjust position of throttle 62. In other words, feedback control of throttle position is utilized, where the desired throttle position is determined based on the EGR flow of air. Note that a control voltage single signal CV can be either a duty cycle or a voltage level.

What is claimed is:

1. A system comprising:
   a diesel fuel engine having an intake manifold and an exhaust manifold;
   an exhaust gas recirculation passage coupled between said engine intake manifold and said engine exhaust manifold;
   a two-position solenoid valve positioned in said exhaust gas recirculation passage;
   a variable area throttle valve coupled to said intake manifold; and
   a controller for calculating an actual amount of exhaust gas flowing through said passage and adjusting said throttle valve based on said actual exhaust gas flow so that said actual exhaust gas flow approaches a desired exhaust gas flow.

2. The system recited in claim 1 wherein said two-position solenoid valve is electronically controlled based on engine operating conditions.

3. The system recited in claim 2 wherein said variable area throttle valve adjusts airflow entering the engine.

4. The system recited in claim 1 wherein said controller further adjusts an amount of injected diesel fuel based on a desired engine output.

5. The system recited in claim 1 wherein said actual exhaust gas recirculation flow is estimated based on pressure upstream and downstream of said two-position valve.

6. A system comprising:
   a diesel engine having an intake manifold and an exhaust manifold;
   an electronically controlled throttle valve coupled to said intake manifold of said diesel engine, where fresh airflow passes by said throttle valve;
   an exhaust gas recirculation passage connecting said intake manifold and said exhaust manifold of said diesel engine;
   a two-position solenoid valve positioned in said exhaust gas recirculation passage; and
   a sensing unit for sensing pressure upstream and downstream of said two-position solenoid valve.

7. The system recited in claim 6 wherein said sensing unit comprises a differential sensor for sensing a differential pressure between pressure upstream and downstream of said two-position solenoid valve.

8. The system recited in claim 6 wherein said sensing unit comprises a first sensor for measuring absolute pressure upstream of said two-position solenoid valve and a second sensor for measuring absolute pressure downstream of said two-position solenoid valve.

9. The system recited in claim 8 wherein said second sensor is coupled to said intake manifold of said diesel engine.

10. The system recited in claim 6 further comprising a diesel fuel injection valve coupled to said diesel engine.

11. A system for an internal combustion engine having a manifold with a first and second inlet, the system comprising:
    a throttle coupled to the first inlet;
    an exhaust gas recirculation unit coupled to the second inlet, where recirculated exhaust flow travels from an engine exhaust to the manifold, said unit comprising a restriction in said flow; and
    a controller for determining an actual exhaust gas recirculation amount based on a first pressure upstream of said restriction and a second pressure downstream of said restriction, adjusting said throttle based on a requested exhaust gas recirculation amount and said determined amount, and adjusting a diesel fuel injection amount in the engine based on an operating condition.

12. The system recited in claim 11 wherein said restriction is a two-position valve.

13. The system recited in claim 11 wherein said restriction is a two-position valve that can be either substantially open or substantially closed.

14. The system recited in claim 11 wherein determining of actual exhaust gas recirculation amount based on said first pressure upstream of said restriction and said second pressure downstream of said restriction includes determining actual exhaust gas recirculation based on a differential pressure between said first and second pressure.

15. A system comprising:
    a diesel fuel engine having an intake manifold and an exhaust manifold;
    an exhaust gas recirculation passage coupled between said engine intake manifold and said engine exhaust manifold;
    a two-position valve positioned in said exhaust gas recirculation passage;
    a variable area throttle valve coupled to said intake manifold; and
    a controller for, during engine operation, adjusting said throttle valve to adjust an amount of exhaust gas flow through said exhaust gas recirculation passage while adjusting a fuel injection amount to adjust engine output and while maintaining said solenoid valve at a first position.

16. The system recited in claim 15 wherein said two-position solenoid valve is electronically controlled based on engine operating conditions.

17. The system recited in claim 15 wherein said two-position solenoid valve is a two-position solenoid valve.

18. The system recited in claim 16 wherein said variable area throttle valve adjusts airflow entering the engine.

* * * * *